United States Patent
Ichimura et al.

(10) Patent No.: US 6,600,714 B2
(45) Date of Patent: Jul. 29, 2003

(54) OPTICAL RECORDING MEDIUM, OPTICAL PICKUP AND OPTICAL RECORDING AND/OR REPRODUCING APPARATUS

(75) Inventors: Isao Ichimura, Tokyo (JP); Koichiro Kishima, Kanagawa (JP); Kenji Yamamoto, Tokyo (JP); Yuji Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 90 days.

(21) Appl. No.: 09/790,017

(22) Filed: Feb. 21, 2001

(65) Prior Publication Data

US 2001/0053117 A1 Dec. 20, 2001

(30) Foreign Application Priority Data

Feb. 21, 2000 (JP) .......................... 2000-048962

(51) Int. Cl.[7] ................................. G11B 7/00
(52) U.S. Cl. .................. 369/275.1; 369/44.23; 369/112.01
(58) Field of Search ............... 369/44.11, 44.14, 369/44.23, 47.1, 53.1, 112.01, 112.24, 275.1, 100

(56) References Cited

U.S. PATENT DOCUMENTS 5,523,994 A * 6/1996 Ando et al. ............ 369/112.19
5,545,454 A * 8/1996 Yamada et al. ............ 428/457

* cited by examiner

Primary Examiner—Muhammad Edun
(74) Attorney, Agent, or Firm—Sonnenschein, Nath & Rosenthal

(57) ABSTRACT

An optical recording medium to which light for recording and/or reproducing is emitted, comprising one or a plurality of inorganic deelectric layers provided at an incident side to which light from an optical system is converged, and an amplitude transmittance, which is a ratio of the light reached to a recording layer in the optical recording medium to said converged light passed through outer circumference area of said optical system, being equal or greater than 30%.

11 Claims, 11 Drawing Sheets

FIG. 4

| AIR GAP A | 0nm | 40nm | 80nm | 120nm |
|---|---|---|---|---|
| DISTANCE h | 1.00 $\mu$m | 1.04 $\mu$m | 1.08 $\mu$m | 1.12 $\mu$m |
| ELECTRO-STATIC CAPACITANCE 0G | 6.95pF | 6.69pF | 6.44pF | 6.21pF |
| OSCILLATION FREQUENCY f | 9.82MHz | 9.92MHz | 10.03MHz | 10.13MHz |

FIG. 6
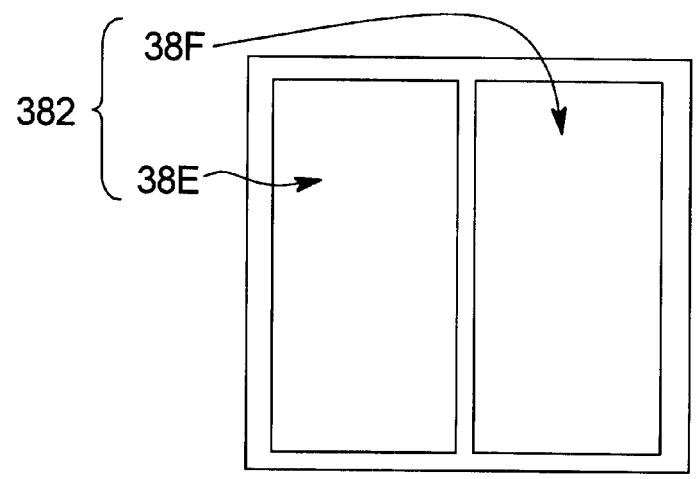
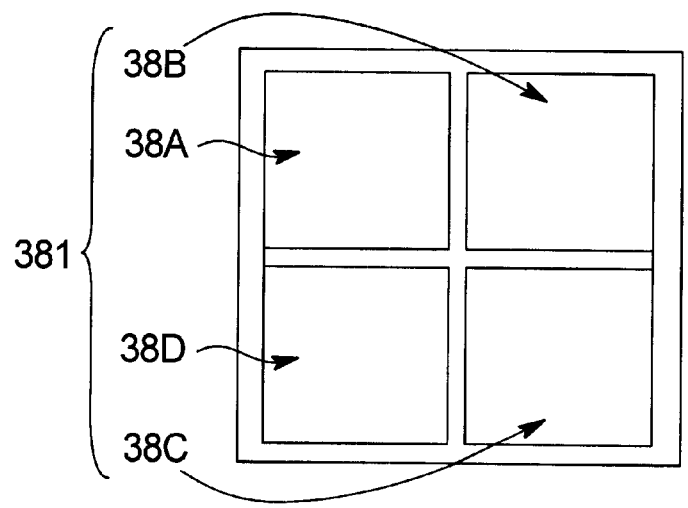
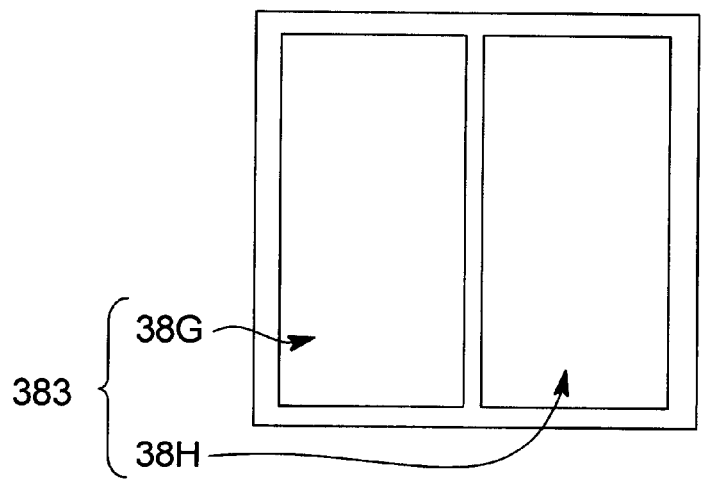

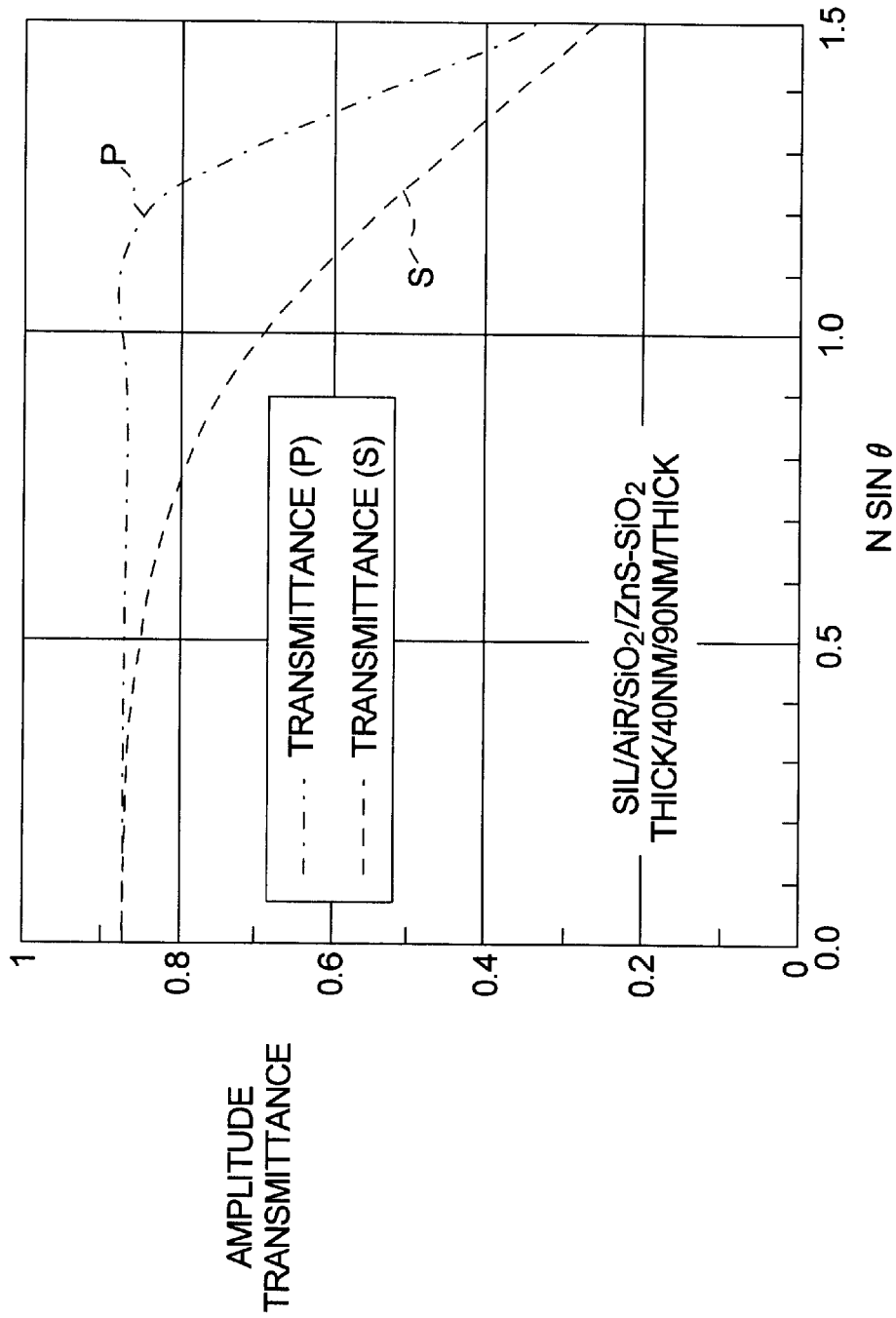

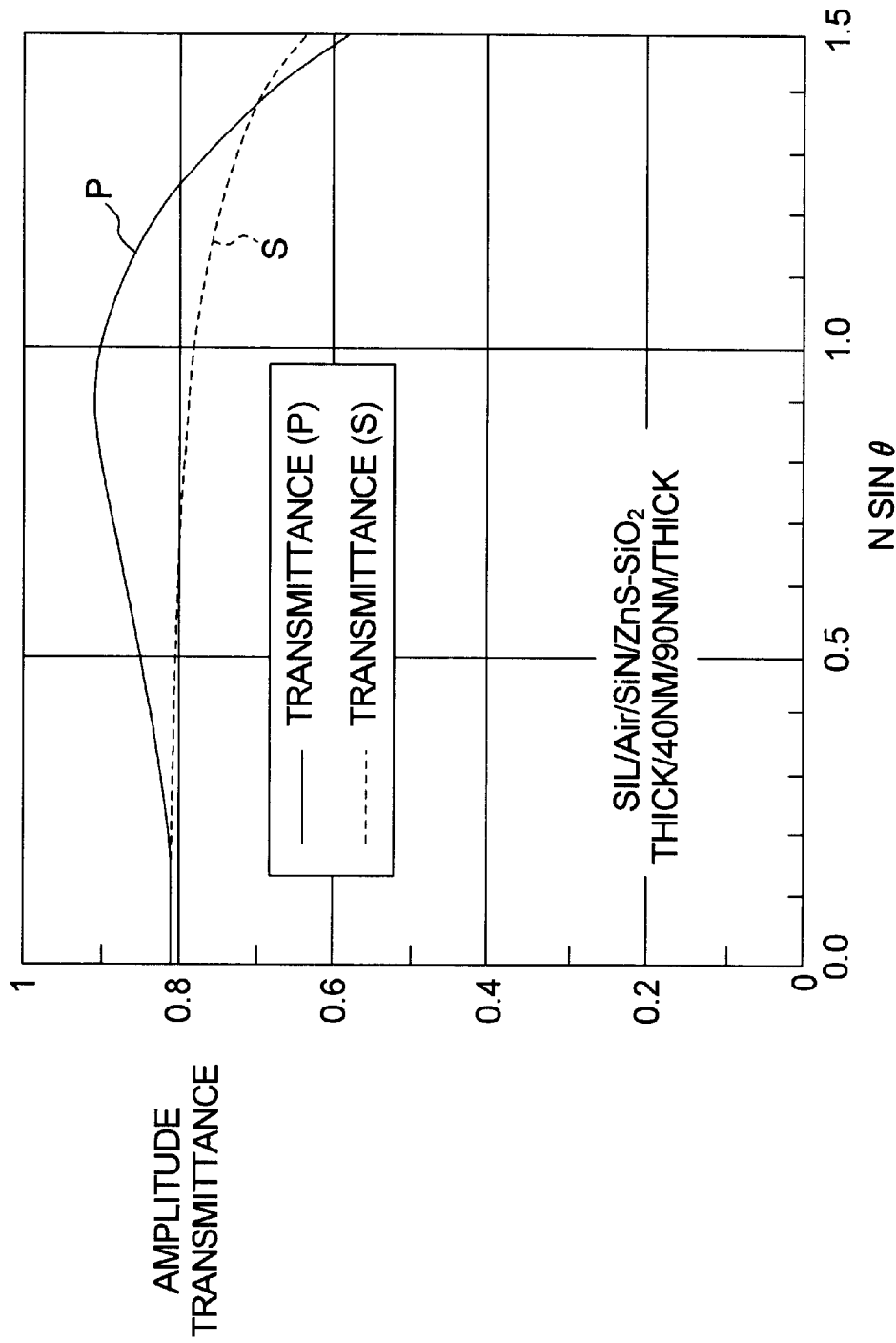

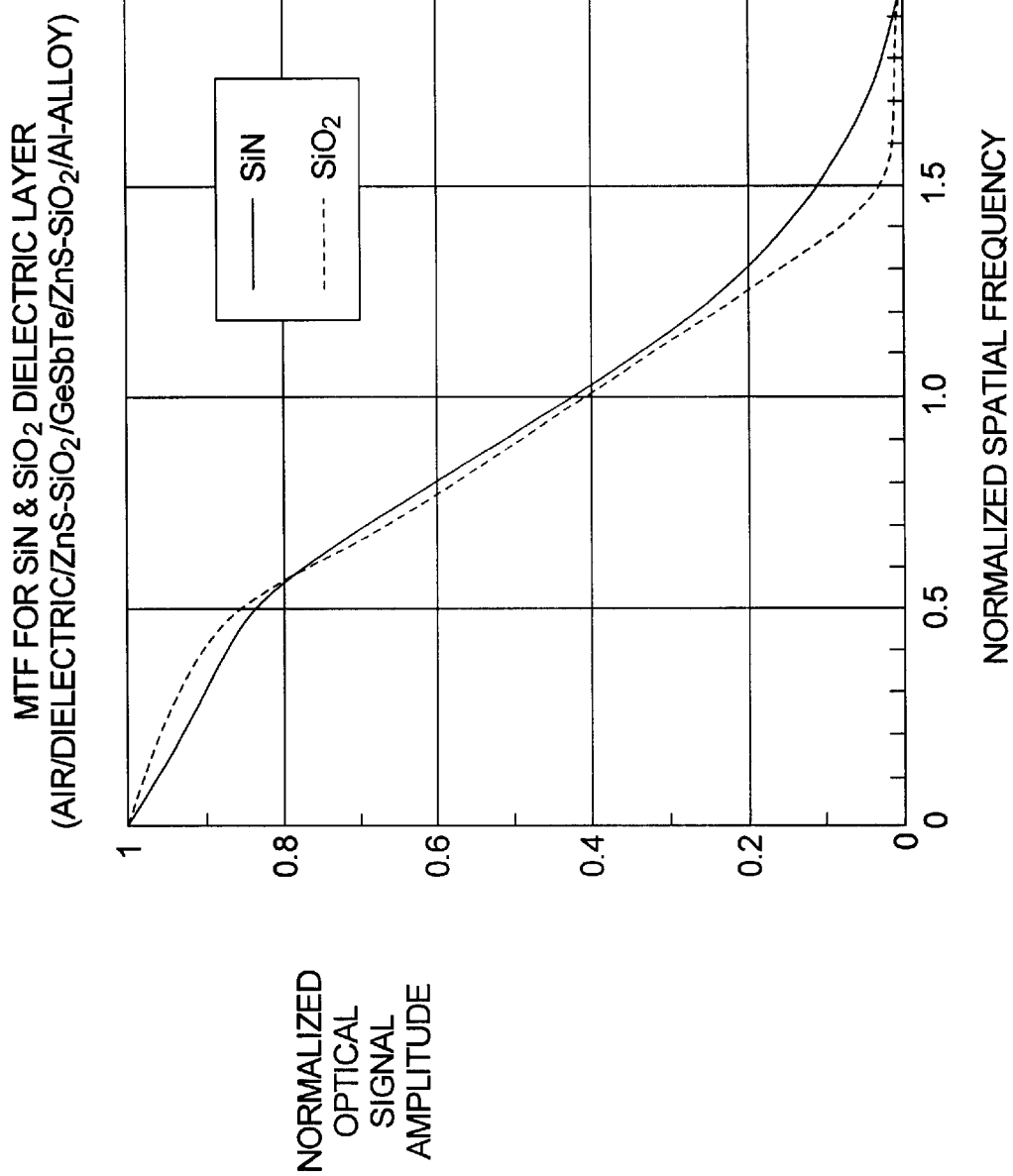

OPTICAL RECORDING MEDIUM, OPTICAL PICKUP AND OPTICAL RECORDING AND/ OR REPRODUCING APPARATUS

RELATED APPLICATION DATA

The present application claims priority to Japanese Application No. P2000-048962 filed Feb. 21, 2000, which application is incorporated herein by reference to the extent permitted by law.

BACKGROUND OF THE INVENTION

1. Field of the Invention

The present invention relates to an optical recording medium, an optical pickup for exposing the converged light to the optical recording medium, and an optical recording and/or reproducing apparatus for recording and/or reproducing an signal by exposing the converged light to the optical recording medium.

2. Description of the Related Art

As examples of the optical apparatus, there is known an optical recording and/or reproducing apparatus for recording and/or reproducing of the information using an optical recording medium such as an optical disk and an optical microscope.

The cut-off spatial frequency fc in the optical apparatus is generally expressed by the following equation (1) using the numerical aperture NA of the objective lens and the wavelength λ of the output light from the light source.

$$fc = 2NA/\lambda \qquad (1)$$

The higher density recording is attempted in the optical recording and/or reproducing apparatus and the more detailed observation can be done in the optical microscope, the shorter the wavelength λ of the light from the light source becomes, further the larger the numerical aperture NA of the objective lens becomes.

As a method for making the numerical aperture NA of the objective lens larger, the near field optical system using a solid immersion lens (SIL) is known, and the optical system which the numerical aperture is greater than 1 is realized by this method.

As a paper describing the near field optical system and solid immersion lens, for example, a paper of S. M. Mansfield, W. R. Studenmund, G. S. Kino, and K. Osato, "High-numerical-aperture lens system for optical storage", Opt. Lett. 18, pp.305–307 (1993) is known.

Further, as another paper, for example, a paper of H. J. Mamin, B. D. Terris, and D. Rugar, "Near-field optical data storage", Appl. Phys. Lett. 68, pp.141–143 (1996) is known.

Note that, the U.S. Pat. No. 4,183,060 and the U.S. Pat. No. 4,300,226 discloses the detection of distance between the optical disk and the electrode by an electrostatic capacitor sensor, however, descriptions about the near field optical system or the solid immersion lens (SIL) are not disclosed.

Japanese Unexamined Patent Publicaion (Kokai) No.H8-212579 discloses an optical head and a recording medium driving apparatus are disclosed. In this Publication, it is disclosed that the objective lens is held by the first lens holder, the immersion lens is held by the second lens holder, the conductive member are used for the second lens holder, and the position control of the immersion lens is carried out based on the electrostatic capacitor between the second lens holder and the optical disk.

When any signal is recorded optically on the optical recording medium or when the recorded signal is reproduced, while the numerical aperture NA of the optical system is large, a coupling of the luminous flux to the optical recording medium is important and relates to the forming of the light spot at the recording layer in the optical recording medium closely.

SUMMARY OF THE INVENTION

An object of the present invention is to provide an optical recording medium capable of improving the contribution of the converged light to the forming of the light spot when the converged light from the optical system forms the light spot at the recording layer in the optical recording medium.

Another object of the present invention is to provide an optical pickup capable of improving the contribution of the converged light to the forming of the light spot when the converged light from the optical system forms the light spot at the recording layer in the optical recording medium.

Still another object of the present invention is to provide an optical recording and/or reproducing apparatus capable of improving the contribution of the converged light to the forming of the light spot when the converged light from the optical system forms the light spot at the recording layer in the optical recording medium.

According to the present invention, there is provided an optical recording medium to which light for recording and/or reproducing a signal is emitted, comprising one or a plurality of inorganic deelectric layers provided at an incident side to which the light is converged, and an amplitude transmittance, which is a ratio of the light reached to a recording layer in the optical recording medium to the converged light passed through outer circumference area of an objective lens, being equal or greater than 30%.

Specifically, the objective lens comprises a solid immersion lens having a large numerical aperture to form a near field.

Preferably, a refractive index of the outermost layer among the inorganic deelectric layers is equal or greater than the refractive index of the objective lens.

Further preferably, an optical recording medium according to the present invention further comprises a first and a second deelectric layers, and the recording layer is positioned between the first and the second deelectric layers, and the first deelectric layer is positioned between the inorganic deelectric layer and the recording layer.

Specifically, the inorganic deelectric layer is a single layer of silicon nitride (SiN).

According to the present invention, there is also provided an optical pickup, comprising a light source, an optical system for converging light from the light source and emitting the converged light to an optical recording medium, and a photodetector for outputting an output signal in response to light reflected at the optical recording medium and passed through the optical system, and the optical recording medium comprising one or a plurality of inorganic deelectric layers provided at an incident side to which the converged light from the optical system is emitted, and a refractive index of the outermost layer among the inorganic deelectric layers is equal or greater than the refractive index of the optical system, and an amplitude transmittance, which is a ratio of the light reached to a recording layer in the optical recording medium to the converged light from the optical system passed through outer circumference area of the optical system, being equal or greater than 30%.

Preferably, the optical system comprises; an objective lens for converging the light emitted from the light source, and a solid immersion lens having a large numerical aperture to form a near field for converging the light passed through the objective lens and emitting the light to the optical recording medium, and the refractive index of the outermost layer among the inorganic deelectric layers is equal or greater than the refractive index of the solid immersion lens.

Specifically, the light source is a laser for outputting a blue or a blue purple laser beam, and the optical system is a near field optical system.

According to the present invention, there is further provided an optical recording and/or reproducing apparatus, comprising a light source, an optical system for converging the light from the light source and emitting the converged light to an optical recording medium, a photodetector for generating an output signal in response to light reflected at the optical recording medium and passed through the optical system, a modulation circuit for modulating the intensity of the light from the light source in response to the recording signal to the optical recording medium, and a detection circuit for detecting the signal recorded on the optical recording medium in response to the output signal from the photodetector, and the optical recording medium comprising one or a plurality of inorganic deelectric layers provided at an incident side to which the converged light from the light system is emitted, and a refractive index of the outermost layer among the inorganic deelectric layers is equal or greater than the refractive index of the optical system, an amplitude transmittance, which is a ratio of the light reached to a recording layer in the optical recording medium to the converged light from the optical system passed through the outer circumference area of the optical system, being equal or greater than 30%.

Preferably, the optical system comprises an objective lens for converging the light emitted from the light source, and a solid immersion lens having a large numerical aperture to form a near field for converging the light passed through the objective lens and emitting the light to the optical recording medium, and the refractive index of the outermost layer among the inorganic deelectric layers is equal or greater than the refractive index of the solid immersion lens.

Specifically, the light source is a laser for outputting a blue or a blue purple laser beam, the optical system is a near field optical system.

By making an amplitude transmittance, which is a ratio of the light reached to a recording layer in the optical recording medium to the converged light passed through the outer circumference area of the optical system, 30% or more or about 30% or more, the contribution of the converged light to forming of the light spot is improved and it is capable to realize the optical recording medium capable of high density recording.

BRIEF DESCRIPTION OF THE DRAWINGS

These and other objects and features of the present invention will become more clearer from the following description of the preferred embodiments with reference to the accompanying drawings, in which:

FIG. 4 is a view for explaining the correspondence among the air gap $\underline{A}$, the interval $\underline{h}$ and the electrostatic capacitance Cg in the optical recording and/or reproducing apparatus shown in FIG. 3;

FIG. 6 is a schematic view of the configuration of a photodetector in the photodetector shown in FIG. 5;

FIG. 9 is a view showing the characteristics of the amplitude transmittance of the beam passing through the inorganic deelectric layer and the deelectric layer and reached at the recording layer when the converged beam consisting of the laser beam is emitted, especially, a view of the characteristics while using the $SiO_2$ as the inorganic deelectric layer in the optical disk shown in FIG. 8;

FIG. 10 is a view showing the characteristics of the amplitude transmittance of the beam passing through the inorganic deelectric layer and the deelectric layer and reached at the recording layer when the converged beam consisting of the laser beam is emitted, especially, a view of the characteristics while using the SiN as the inorganic deelectric layer in the optical disk shown in FIG. 8; and FIG. 11 is a view for explaining the difference of the coupling between the cases using the $SiO_2$ as the inorganic deelectric layer and using the SiN as the inorganic deelectric layer by the optical transfer function (MTF) in the optical disk shown in FIG. 8.

DESCRIPTION OF THE PREFERRED EMBODIMENTS

Preferred embodiments of the present invention will be explained with reference to the attached drawings.

An optical disk apparatus for carrying out an optical recording and/or reproducing of an optical recording medium including a phase change type optical disk will be described as an example of the optical recording and/or reproducing apparatus according to the present invention.

Optical Head

Figure 1:
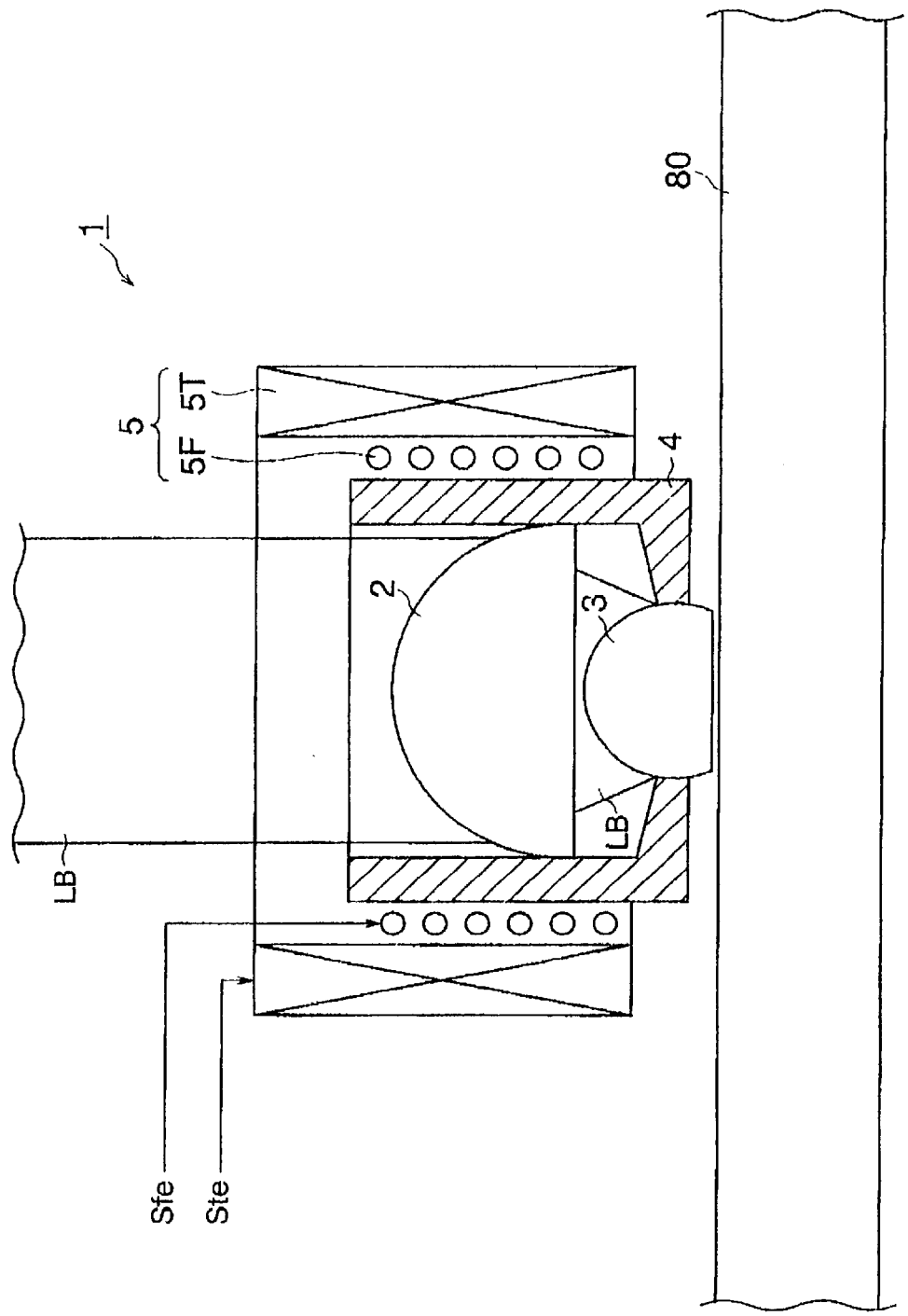
FIG. 1 is a schematic view of the configuration of an optical head.

FIG. 1 is a schematic view of the configuration of an optical head, and the optical head is mounted on an optical pickup of the optical disk apparatus.

The optical head 1 comprises an objective lens 2, a solid immersion lens (SIL) 3, a lens holder 4 and double axes electromagnetic actuator 5.

The objective lens 2, to which a laser beam (laser light) LB is emitted from a semiconductor laser as a light source in the optical pickup, converges the laser beam LB and emits it to the solid immersion lens 3.

The solid immersion lens 3 converges the laser beam LB passed through the objective lens 2 and emits the converged light of the laser beam to an optical disk 80.

The solid immersion lens 3 have a shape of a part cut off from a spherical lens and generally called as "Super Sphere SIL" or "Hyper Sphere SIL".

The solid immersion lens 3 is arranged in such a way that the spherical surface faces to the objective lens 3 and the opposite surface of the spherical surface (the bottom surface) faces to the optical disk 80.

The lens holder 4 integratedly holds the objective lens 2 and the solid immersion lens 3 in the certain positional relationship.

The immersion lens 3, when the laser beam LB which directs in parallel to the optical axis is exposed to the objective lens 2, converges the laser beam LB from the objective lens 2, passes it through the center part of the bottom surface of the solid immersion lens 3, and exposes the passed laser beam LB to the optical disk 80.

Note that, the objective lens 2 and the solid immersion lens 3 are arranged in such a way that the optical axes of them coincide, and the center part is positioned on this optical axis.

The lens holder 4 includes a conductive member, a conductive film is formed on the bottom surface of the solid immersion lens 3 as described later, and the conductive film of the bottom surface and the conductive member of the lens holder 4 are electrically connected by solder or other material.

The electromagnetic actuator 5 moves the lens holder 4.

The electromagnetic actuator 5 comprises a focusing actuator 5F and a tracking actuator 5T.

The focusing actuator 5F moves the lens holder 4 in response to a control signal Sfe in a focusing direction which is perpendicular to a recording plane of the optical disk 80 to maintain positions of the solid immersion lens 3 and the optical disk 80 in a predetermined distance.

The tracking actuator 5T moves the lens holder 4 in response to the control signal Ste in a radial direction (or a tracking direction) of the optical disk 80 to direct the laser beam LB passed through the solid immersion lens 3 to the center part of the track of the optical disk 80.

Note that, the solid immersion lens 3 is designed to converge the laser beam LB without aberration and is satisfied the condition of the stigmatic focusing the solid immersion lens 3 converges the laser beam LB from the objective lens 2 to make the focal point position on the recording plane of the optical disk 80.

The thickness $\underline{t}$ of the solid immersion lens 3 in the optical axis direction is expressed by the following equation (2) using of a radius $\underline{r}$ and a refractive index $\underline{n}$ of the spherical lens.

$$t = r \times (1 + 1/n) \quad (2)$$

Further, according to the paper of H. J. Mamin, et al. a reference literature 2, the numerical aperture $NA_{eff}$ of the optical system comprising the objective lens 2 and the solid immersion lens 3 is expressed by the following equation (3) using the numerical aperture $NA_{obj}$ and the refractive index $\underline{n}$ of the solid immersion lens 3.

$$NA_{eff} = n^2 \times NA_{obj} \quad (3)$$

In this embodiment, the solid immersion lens 3 of which the numerical aperture $NA_{obj}$ of the object lens 2 is 0.45 and the refractive index $\underline{n}$ is 1.83 is employed as an example.

In this case, by the above equation (3), the numerical aperture $NA_{eff}$ of the optical system comprising the objective lens 2 and the solid immersion lens 3 is about 1.5. the numerical aperture $NA_{eff}$ of the optical system may be, for example, equal or greater than 1 and smaller than 3, or greater than 1 and equal or smaller than 2.5 or 2.

Further, the wavelength λ of the laser beam LB is about 405 nm as an example, and an air gap $\underline{A}$ for forming the near field is $0 < \underline{A} < 100$ nm as an example, and preferably, the $\underline{A}$ is held at about 40 nm.

Because the light in the area of which the numerical aperture is greater than 1 (high NA area) becomes an evanescent wave and realizes in the near field coupling, its transmission efficiency decreases in an exponential function in response to the distance (air gap) between the optical disk 80 and the solid immersion lens 3. In this embodiment, to make use of the numerical aperture effectively, it is preferable to control the air gap $\underline{A}$ to approximately 1/10 of the light source wavelength λ, namely to approximately 40 nm ($\underline{A} \neq 40$ nm).

Solid Immersion Lens

Figure 2:
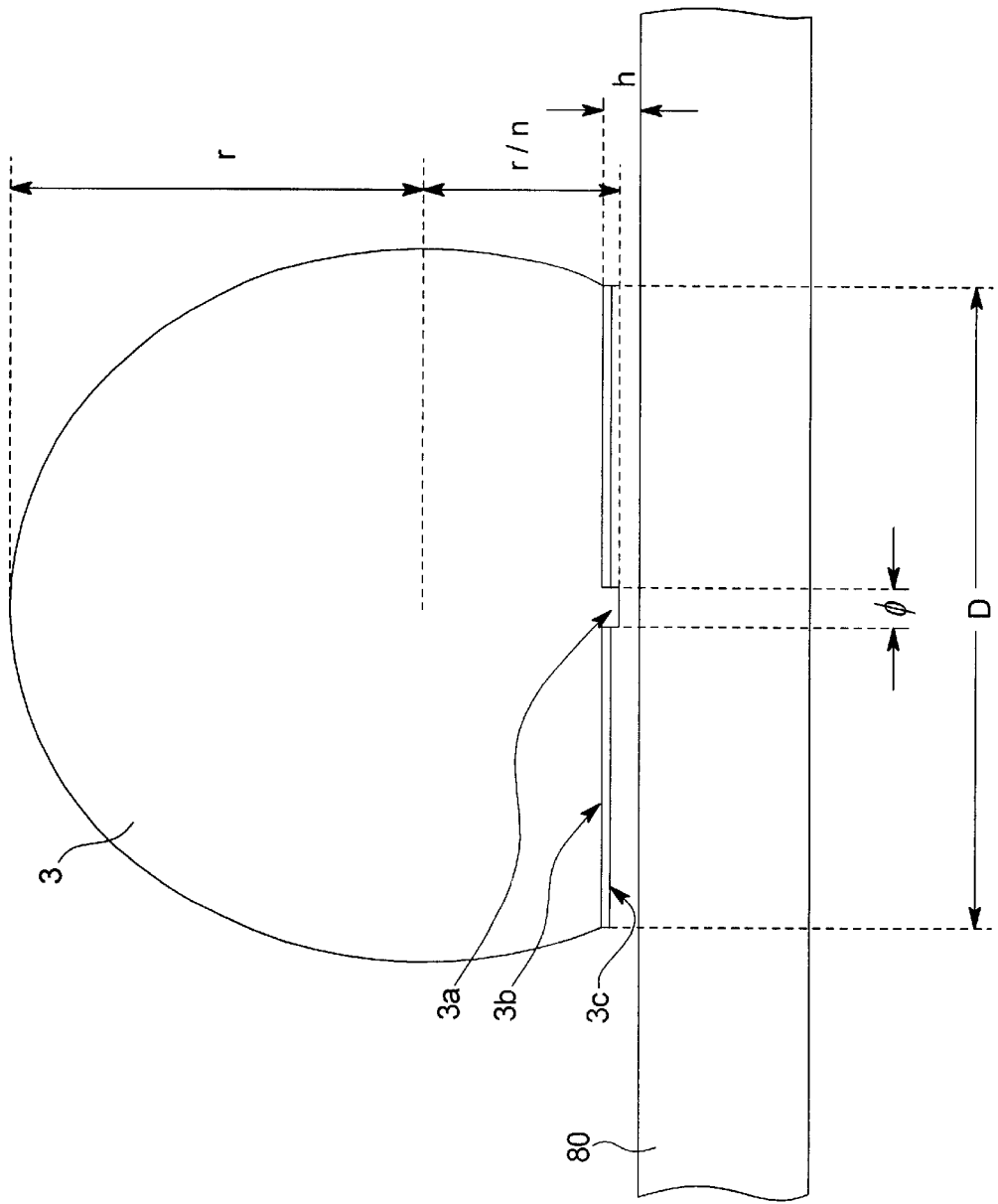
FIG. 2 is a view of an example of the configuration of an immersion lens.

FIG. 2 is a view showing an example of the configuration of the solid immersion lens.

In a facing surface (the bottom surface) of the solid immersion lens 3 facing to the optical disk 80, its diameter $\underline{D}$ is about 1 mm, the center part 3a projects, and its circumference part 3b is flat.

In the projection of the center part 3a, its height is about 1 μm and its diameter Φ is about 40 μm.

A conductive film 3c of aluminium, etc. is formed by the vapor deposition, etc. and covers on the flat surface of the circumference part 3b, and the film thickness of the conductive film 3c is thinner than the height of the projection (about 1 μm).

The conductive film 3c and the reflection film (the recording film) of aluminium etc. of the optical disk 80 form an electrostatic capacitor of a capacitance Cg in response to the distance $\underline{h}$ between the flat surface of the solid immersion lens 3 and the optical disk 80.

The electrostatic capacitance Cg is expressed by the following equation (4) using a facing area $\underline{S}$ and the distance $\underline{h}$ of the circumference part 3b and the optical disk 80. Note that, it is supposed that the film thickness of the conductive film 3c is small than the distance $\underline{h}$ and the thickness can be neglected.

$$Cg = \epsilon_0 \times \epsilon_r \times S/h \quad (4)$$

Where, $\epsilon_0$ is the dielectric constant at vacuum condition and its value is $8.854 \times 10^{-12}$ F/m. The $\epsilon_r$ is a relative dielectric constant in air and its value is approximately 1.

The facing area $\underline{S}$ is $\lambda \times (D/2)^2$, and thus is approximately $7.85 \times 10^{-6}$ m² when the diameter $\underline{D}$ of the bottom surface is approximately 1 mm.

The distance $\underline{h}$ shows the minimum value of 1 μm when the projection of the center part 3a contacts to the optical disk 80, that is when the distance (air gap) $\underline{A}$ between the optical system comprising the objective lens 2 and the solid immersion lens 3 and the optical disk 80 is 0 nm.

The distance $\underline{h}$ is respectively 1.04 μm, 1.08 μm or 1.12 μm when the air gap $\underline{A}$ is 40 nm, 80 nm or 120 nm.

Accordingly, when the air gap $\underline{A}$ is 0 nm, 40 nm, 80 nm or 120 nm, by the equation (4), the electrostatic capacitance Cg is respectively approximately 6.95 pF, approximately 6.69 pF, approximately 6.44 pF or approximately 6.21 pF and it is monotonously decreased.

As mentioned above, because the electrostatic capacitance Cg is varied in response to the air gap $\underline{A}$, the air gap $\underline{A}$ can be detected by using the electrostatic capacitance Cg, and by carrying out the servo control of the electromagnetic actuator 5 by using the electrostatic capacitance Cg, it can be maintained that the air gap $\underline{A}$ is in the near field area.

Further, because of making the center part 3a of faced plane of the solid immersion lens 3 project and forming the conductive film 3c on the circumference area 3b thinner than the height of the projection, it can be prevented that the conductive film 3c closes to the optical disk 80 than the center part 3a and contacts to the surface of the optical disk 80.

Further, as shown in FIG. 1, because the conductive film 3c and the conductive lens holder 4 are connected electrically, wire connections for the conductive film 3c can be easily carried out through the lens holder 4.

Optical Recording and/or Reproducing Apparatus

Figure 3:
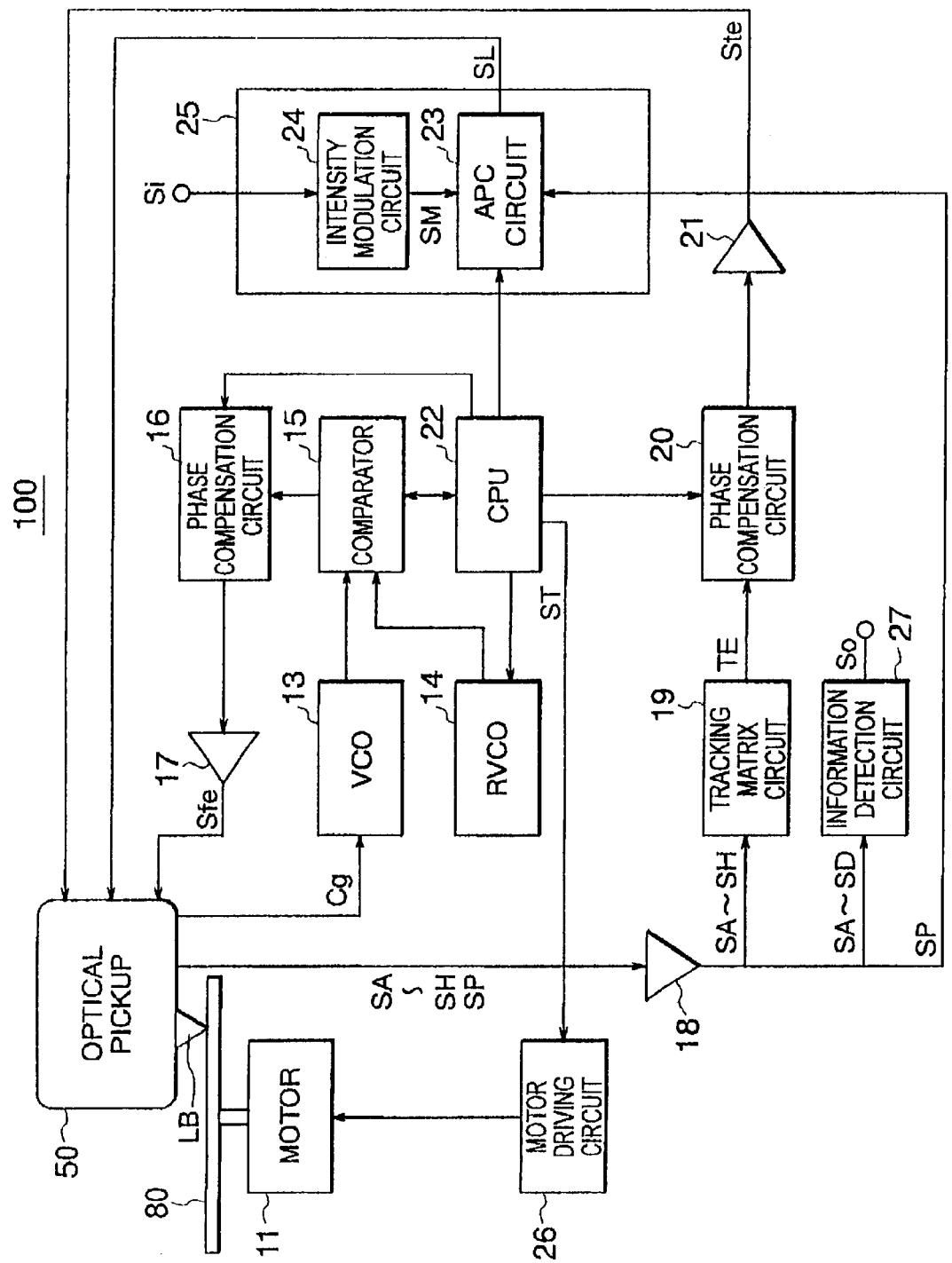
FIG. 3 is a schematic block diagram of the configuration of an optical recording and/or reproducing apparatus of a first embodiment of the present invention, especially, a view showing an optical disk apparatus as the optical recording and/or reproducing apparatus as an example.

FIG. 3 is a schematic view of the configuration of a first embodiment of the optical recording and/or reproducing apparatus according to the present invention and shows an optical disk apparatus as an example of the optical recording and/or reproducing apparatus. In this optical disk apparatus 100, the optical head 1 shown in FIG. 1 is mounted on an optical pickup 50.

The optical disk apparatus 100 comprises the optical pickup 50, a motor 11, a voltage controlled oscillator (VCO) 13, a reference voltage controlled oscillator (RVCO) 14, a comparator 15, phase compensation circuits 16 and 20, amplifiers 17, 18 and 21, a tracking matrix circuit 19, a central processing unit (CPU) 22, a semiconductor laser driving circuit 25, a motor driving circuit 26, an information detection circuit (detection circuit) 27 and a focus error detection circuit. The focus error detection circuit is not shown in the figures.

The semiconductor laser driving circuit 25 comprises an automatic power control (APC) circuit 23 and an intensity modulation circuit (modulation circuit) 24.

The optical disk apparatus 100 exposes the laser beam having the wavelength of approximately 405 nm on the optical disk 80 by using the optical pickup 50 to carry out an optical recording or an optical reproducing of a signal.

The optical disk 80 mounted on the optical disk apparatus 100 is rotated at the predetermined rotation speed by the motor 11. As an example, the signal is recorded on the optical disk 80 by a CLV (constant linear velocity recording) method.

A focus servo signal processing system is constructed as follows.

The VCO (Voltage Controlled Oscillator) 13 comprises a LC oscillation circuit including an inductor in inside and a capacitor at outside.

One electrode of the external capacitor is the conductive film 3c formed on the flat surface of the solid immersion lens 3 of the optical head 1, another electrode is the reflection film or the recording film of the optical disk 80, and this capacitor have the electrostatic capacitance Cg in response to the distance $\underline{h}$ between the flat surface and the optical disk 80.

The oscillation frequency $\underline{f}$ of the VCO 13 is expressed by the following equation (5) using the electrostatic capacitance Cg of the external capacitor, the floating capacitance Cf of the circuit and the inductance $\underline{L}$ of the inside inductor.

$$f=1/[2\Pi \times \{L \times (Cg+Cf)\}^{1/2}] \quad (5)$$

The relationships among the air gap $\underline{A}$, the distance $\underline{h}$, the electrostatic capacitance Cg and the oscillation frequency $\underline{f}$ are shown in FIG. 4. Here, as an example, the inductance $\underline{L}$ is 22 $\mu$H and the floating capacitance Cf is 5 pF.

When the air gap $\underline{A}$ is 0 nm, 40 nm, 80 nm or 120 nm, the oscillation frequency $\underline{f}$ is respectively defined as approximately 9.82 MHz, approximately 9.92 MHz, approximately 10.03 MHz or approximately 10.13 MHz by the above equation (5).

The reference voltage controlled oscillator (RVCO) 14 generates a reference signal.

The frequency fr of the reference signal is 9.92 MHz as an example and this frequency is equal to the oscillation frequency of VCO 13 when the air gap $\underline{A}$ is 40 nm.

Note that, as an example, RVCO 14 comprises a varactor (variable capacitance) diode, the frequency fr of the reference signal can be set at a predetermined value by controlling the voltage applied to the varactor diode by the CPU 22.

The comparator 15 is constructed by a frequency and phase discriminator as an example, and the output signal of the frequency f from the VCO 13 and the output signal of the frequency fr from the RVCO 14 are applied thereto.

The comparator 15 compares the frequency and the phase of the output signal from VCO 13 and the frequency and the phase of the output signal from RVCO 14 and generates a signal (error signal) in response to the difference between both of frequencies and phases.

The phase compensation circuit (phase compensator) 16, to which the output signal from the comparator 15 is applied, compensates the output signal from the comparator 15 on phase compensation and/or frequency compensation to generates a resultant compensation signal and apply it to the amplifier 17.

The amplifier 17 amplifies the compensation signal and applied it to the focusing actuator 5F of the electromagnetic actuator 5 as a control signal Sfe for adjusting the air gap $\underline{A}$.

The focusing actuator 5F moves the lens holder 4 in the focusing direction in response to the control signal Sfe from the amplifier 17 to maintain the air gap $\underline{A}$ in the area forming the near field. As a result, the air gap $\underline{A}$ is maintained in 0<A=<100 nm and adjusted approximately 40 nm, and the distance $\underline{h}$ is adjusted at approximately 1.04 $\mu$m, and thus the focus servo is realized.

The central processing unit (CPU) 22 is a controller for controlling the whole of the optical disk apparatus 100 and, for example, formed by a one chip microcomputer.

The output signal of the comparator 15 is applied to the CPU 22 and the CPU 22 detects that the air gap $\underline{A}$ is maintained in the near field area (the area forming the near field) based on the output signal of the comparator 15.

Further, the CPU 22 generates a start signal ST, applies the start signal ST to the motor driving circuit 26, and makes the laser beam LB output from the optical pickup 50 after the start of the rotation of the optical disk 80. The CPU 22 receives a signal indicating the number of rotations or the rotation speed of the motor 11 or the optical disk 80.

The tracking servo and the focus servo are carried out under the control of the CPU 22.

The motor driving circuit 26 provides the electrical power to the motor 11 to drive the motor 11 and controls the rotation, for example by the PWM (Pulse Width Modulation) control or PLL (Phase Locked Loop) control.

The motor driving circuit 26 starts the driving of the motor 11 when the start signal ST from the CPU 22 is input.

The motor 11 is constructed by a spindle motor as an example. A turntable not shown in Figures is installed on the rotation axis of the motor 11, and when the optical disk 80 is mounted thereon, the motor 11 rotates the turntable to thereby rotate the optical disk 80. Note that, the motor 11 may be constructed by the turntable and the spindle motor as an integrated motor.

Figure 5:
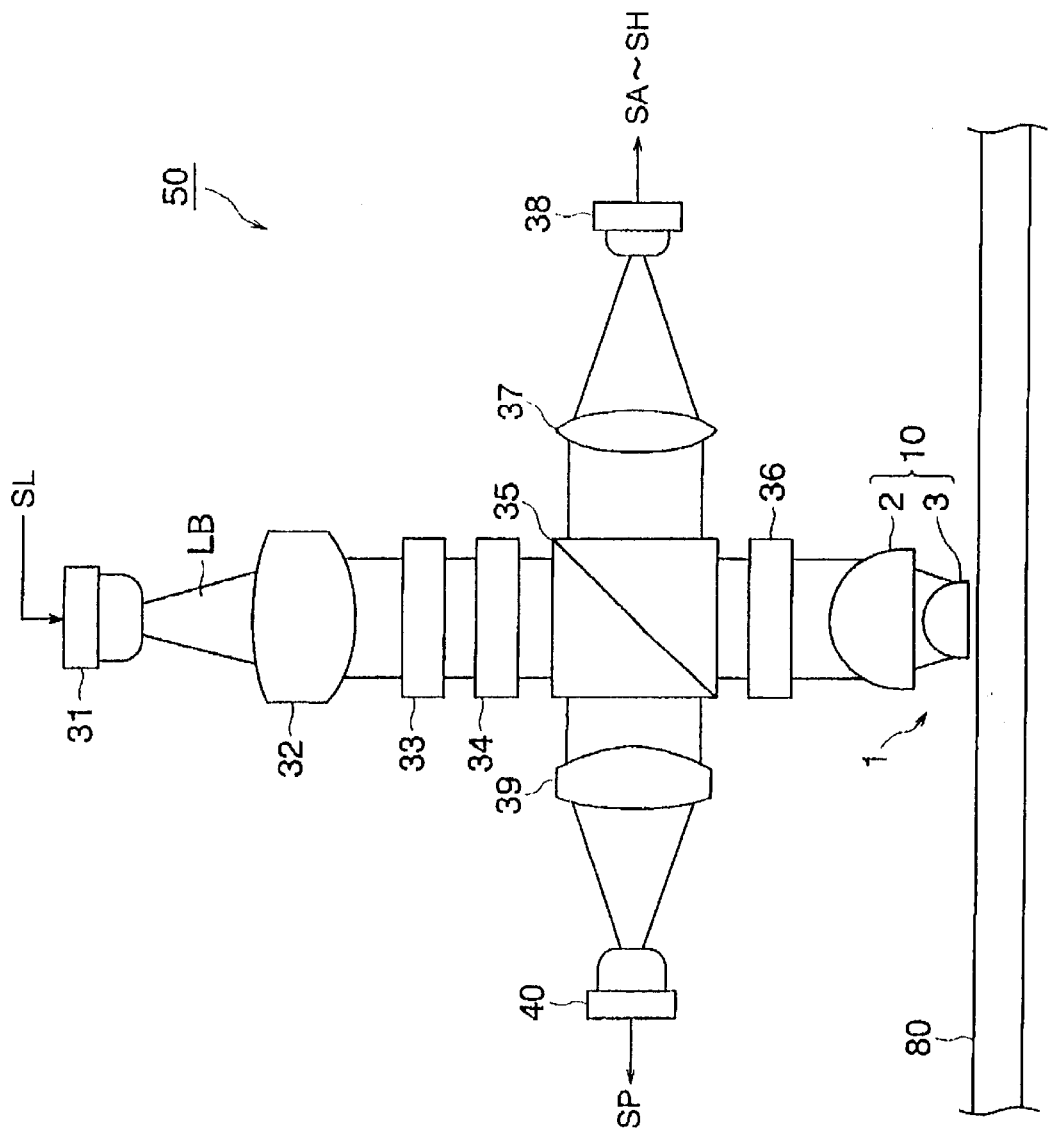
FIG. 5 is a view of an example of the configuration of the optical pickup in the optical recording and/or reproducing apparatus shown in FIG. 3.

FIG. 5 is a view of an example of the configuration of the optical pickup 50.

The optical pickup 50 comprises a semiconductor laser 31, a collimator lens 32, a diffraction grating 33, a ½ wavelength plate 34, a polarized light beam splitter 35, a ¼ wavelength plate 36, converging lenses 37 and 39, photodetectors 38 and 40, an objective lens 2, and a solid immersion lens 3.

The optical head 1 is mounted on the optical pickup 50, and the optical head 1 comprises an optical system 10 including the objective lens 2 and the solid immersion lens 3.

The semiconductor laser 31 is an example of a light source and a light emission device emitting a coherent light. The semiconductor laser 31 generates linear polarized laser beam LB, of which color is blue or blue purple and of which wavelength is approximately 405 nm, and emits the laser beam LB to the collimator lens 32.

The collimator lens 32 changes a shake of the laser beam LB from the semiconductor laser 31 to parallel light and emits it to the diffraction grating 33.

The diffraction grating 33 separates the laser beam LB from the collimator lens 32 into a main beam (the 0th order diffraction beam) and sub beam (the first order diffraction beam) and emits the main beam and the sub beam to the wavelength plate 34.

The ½ wavelength plate 34 rotates planes of polarization of the main beam and the sub beam from the diffraction grating 33 and emits them to the polarized light beam splitter 35.

The polarized light beam splitter 35 passes through the majority of the exposed laser beam from the ½ wavelength plate 34 and emits the same to the ¼ wavelength plate 36 and reflects a part of the exposed laser beam to emit it to the converging lens 39.

The converging lens 39 converges the reflected laser beam from the polarized light beam splitter 35 to emit it to the photodetector 40.

The photodetector 40 changes the laser beam from the converging lens 39 to electrical signals to generates a signal SP in response to the amount and intensity of light of the laser beam, the photodetector 40 is used for monitoring the intensity of the light emission of the semiconductor laser 31 or for monitoring the beam intensity on the recording layer (the recording film) of the optical disk 80.

Note that, the quantity of light of the exposed laser beam to the photodetector 40 is adjustable by adjusting the rotation angle of the ½ wavelength plate 34.

The ¼ wavelength plate 36 rotates the plane of polarization of the laser beam passed through the polarized light beam splitter 35 to obtain a circularly polarized light, and emits the circularly polarized laser beam to the objective lens 2 of the optical pickup 1.

The objective lens 2 converges the laser beam from the ¼ wavelength plate 36 and emits it to the solid immersion lens 3.

The solid immersion lens 3 converges the laser beam from the objective lens 2, passes through the center part 3a, and emits this passed laser beam to the signal recording plane of the optical disk 80.

The laser beam reflected at the signal recording plane (recording film) of the optical disk 80 is passed through the solid immersion lens 3 and the objective lens 2 and emitted to the ¼ wavelength plate 36.

The ¼ wavelength plate 36 rotates the plane of polarization of the laser beam from the objective lens 2 to obtain a linearly polarized light and emits the linearly polarized laser beam to the polarized light beam splitter 35.

Note that, the plane of polarization of the exposed laser beam emitted from the polarized light beam splitter 35 to the ¼ wavelength plate 36 crosses the plane of polarization of the reflected laser beam emitted from the ¼ wavelength plate 36 to the polarized light beam splitter 35 at right angles.

The polarized light beam splitter 35 reflects the laser beam from the ¼ wavelength plate 36 and emits it to the converging lens 37.

The converging lens 37 converges the reflected laser beam from the polarized light beam splitter 35 and emits it to the photodetector 38.

The photodetector 38 carries out photoelectric conversion to the laser beam from the converging lens 37 to generate signals SA to SH, the photodetector 38 is used for detection the tracking error signal TE, the reproducing signal etc.

As shown in FIG. 6, the first light receiving portion 381 for receiving the main beam is arranged in the center part of the photodetector 38, and the second and third light receiving portions 382 and 383 for receiving the sub beams are arranged in the both sides of the first light receiving portion 381.

The first light receiving portion 381 is divided equally or almost equally into the four light receiving portions 38A to 38D.

The second light receiving portion 382 is divided equally or almost equally into the two light receiving portions 38E and 38F.

The third light receiving portion 383 is divided equally or almost equally into the two light receiving portion 38G to 38H.

The photodetector 38 may be formed by the light receiving portion divided into eight light receiving devices.

The output signals SA to SH from the light receiving portion 38A to 38H of the photodetector 38 are amplified by the amplifier (head amplifier) 38 shown in FIG. 3 and applied to the tracking matrix circuit (the tracking error detection circuit) 19, the information detection circuit 27 etc.

The tracking matrix circuit 19 carries out the operation of the following equation (6) in response to the amplified output signals SA to SH and generates a tracking error signal TE using the differential push-pull method. Note that, $k$ in the equation is a constant based on the difference of the quantities of light of the main beam and the sub beam.

$$TE=(SA+SD)-(SB+SC)+k\times((SE+SF)+(SG+SH)) \quad (6)$$

The phase compensation circuit 20, to which the tracking error signal TE is applied, carries out the compensation of the tracking error signal TE (the phase compensation and/or the frequency compensation) to generate the compensation signal and applies it to the amplifier 21.

The amplifier 21 amplifies the compensation signal and applies it to the tracking actuator 5T of the electromagnetic actuator 5 as the control signal Ste.

The tracking actuator 5T moves the lens holder 4 in response to the control signal Ste from the amplifier 21 in the radial direction (or the tracking direction) of the optical disk 80, so that the tracking servo is realized.

Note that, for detecting a tracking error signal, one spot push-pull method, three spots method, the phase difference method etc. may be applied except for the differential push-pull method mentioned above, and as a photodetector, suitable photodetector for each of these error signal detection methods may be used.

The information detection circuit 27 carries out the operation of the following equation (7) using the output signals SA to SD amplified by the amplifier (head amplifier) 18 to generate a reproducing signal RF in response to the quantity of the reflected light. Then, it carries out the demodulation, etc. in response to the reproducing signal RF to reproduce the recording signal So of the optical disk 80.

$$RF=SA+SB+SC+SD \quad (7)$$

The semiconductor laser driving circuit 25 comprises an intensity modulation circuit 24 and an APC circuit 23 and drives the semiconductor laser 31 in the optical pickup 50.

The intensity modulation circuit 24, to which a signal Si to be recorded on the optical disk 80 is applied from a memory or external device, etc., generates the modulated control signal SM in response to the signal Si.

To the APC (Automatic Poser Control) circuit 23, the output signal SP of the monitoring use photodetector 40 in the optical pickup 50 is applied through the amplifier 18 and the modulated control signal SM is applied from the intensity modulation circuit 24. The APC circuit 23 generates the driving signal SL to drive the semiconductor laser 31 in response to the output signal SP and the modulated control signal SM.

The APC circuit 23, in the case of recording, makes the driving voltage or the driving current of the semiconductor laser 31 change in response to the modulated control signal SM to do the intensity modulation toward the laser beam LB, and keeps the intensity of the light emission of the semiconductor laser 31 in the first predetermined range R1 in response to the output signal SP of the photodetector 40 to adjust output of the laser beam of the semiconductor laser 31.

On the other hand, the APC circuit 23, in the case of reproducing, keeps the intensity of the light emission of the semiconductor laser 31 in the second predetermined range R2 (<R1) in response to the output signal SP of the photodetector 40 to adjust output of the laser beam of the semiconductor laser 31.

Coupling

When composing the optical system 10 that numerical aperture NA is greater than 1 using the immersion lens 3 and recording a signal optically on the optical disk 80 or reproducing the recorded signal optically, a coupling of luminous flux to the optical disk 80 occupies an important part.

It is important to keep the distance (air gap) between the solid immersion lens 3 and the optical disk 80 small, at the same time, by a coating is given on the surface of the optical disk 80 facing the solid immersion lens 3, the coupling efficiency to the optical disk 80 can be improved.

Figure 7:
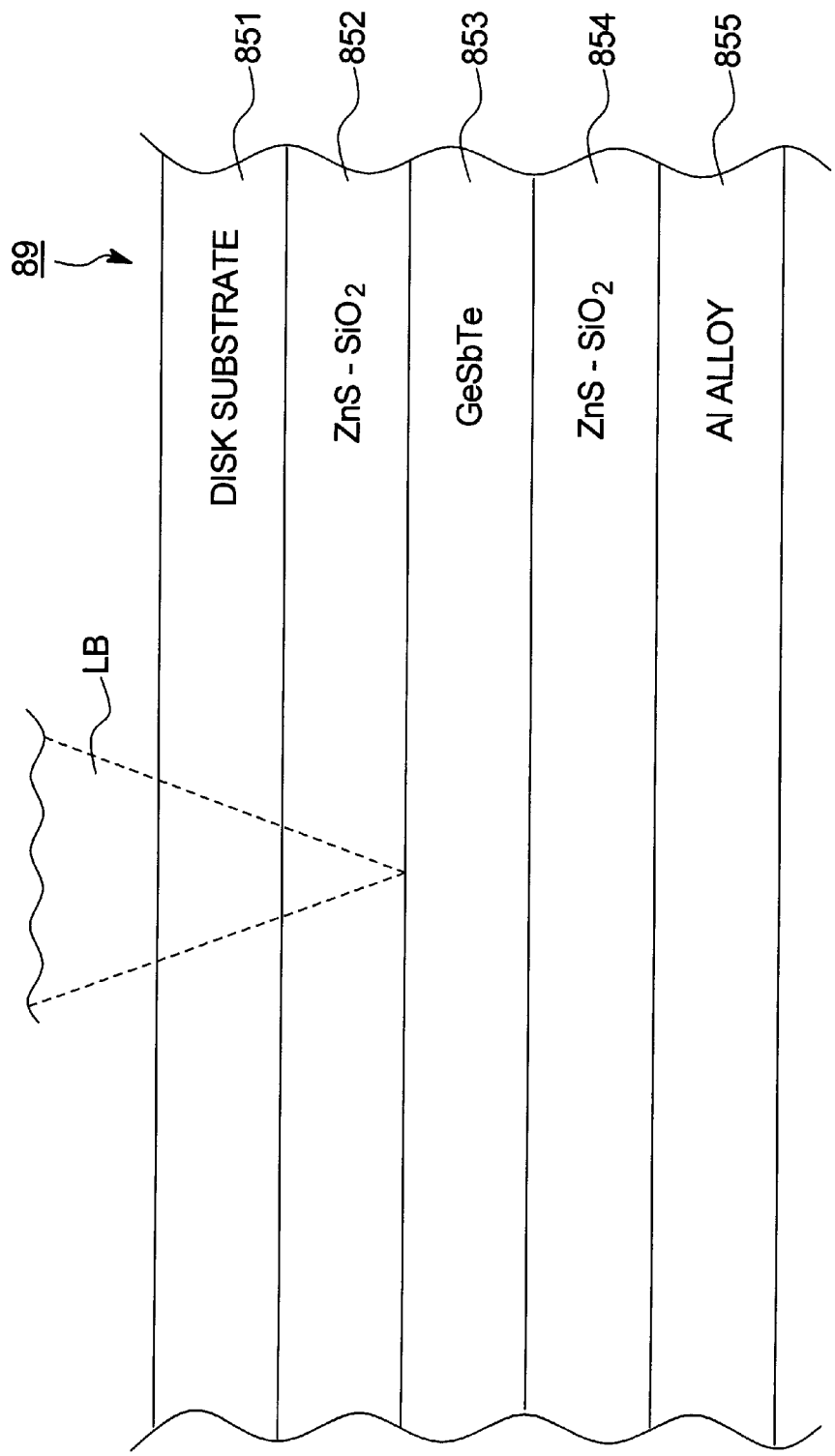
FIG. 7 is a schematic view of the configuration of an optical disk as a reference example.

FIG. 7 is a schematic view of an example for reference of the configuration of the optical disk.

For example the optical disk 89 is a digital video disk (DID) and it comprises a disk substrate 851, deelectric layers 852 and 854, a recording layer 853, and an aluminium layer 855.

The recording layer 853 is composed of GeSbTe and has a constant or approximately constant thickness of about 20 nm to about 30 nm. In the recording layer 853, the crystal state and the non-crystal state are made by the heat due to exposing of the laser beam, and by using the difference of the reflectances of light in the cases of the crystal state and the non-crystal state, optical recording of a signal is carried out.

The disk substrate 851 is composed of, for example, plastics and has a constant or approximately constant thickness of about 0.6 mm.

The deelectric layers 852 and 854 are composed of ZnS—SiO$_3$ and put the recording layer 853. The deelectric layer 852 has a constant or approximately constant thickness of about 100 nm and the deelectric layer 854 has a constant or approximately constant thickness of about 20 nm to about 30 nm.

The aluminium layer 855 has a constant or approximately constant thickness of about 150 nm.

The laser beam LB from the solid immersion lens 3 is converged to the recording layer 853 through the disk substrate 851 as a light transmission protection layer and the deelectric layer 852.

At the bottom of the optical disk 89, an aluminium layer 855 is arranged and this layer 855 functions as a reflection film and a heat sink.

These multiple layers of films is stacked by the sputtering method, the thickness of each of the layers 852 to 855 is optimized based on a disk structure and recording conditions.

Figure 8:
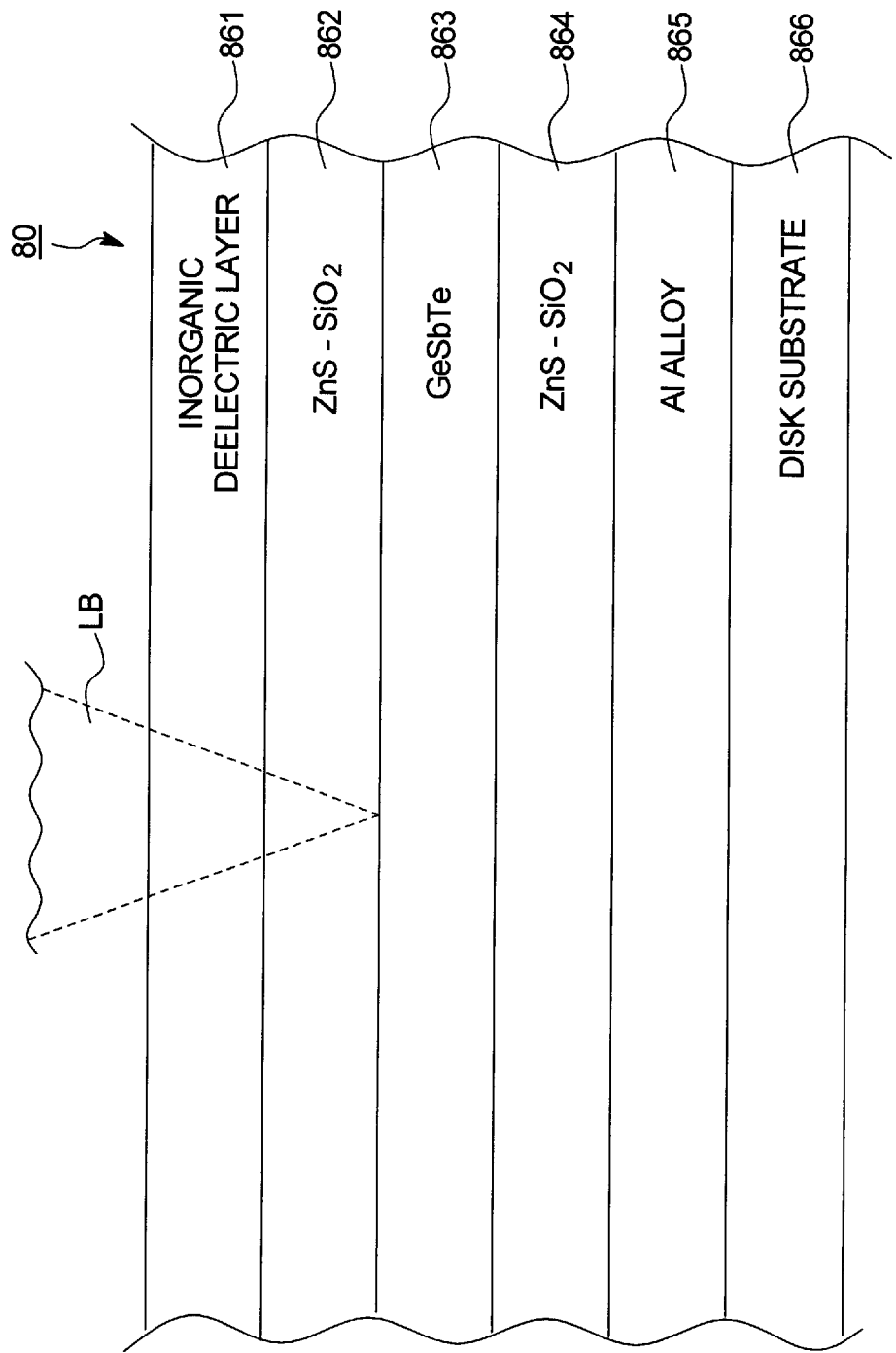
FIG. 8 is a schematic view of the configuration of the optical disk used in the optical disk.

FIG. 8 is a schematic view of the configuration showing the structure of the optical disk 80 used with the optical disk apparatus 100.

The optical disk 80 comprises an inorganic deelectric layer 861, deelectric layers 862 and 864, a recording layer 863, an aluminium layer 865, and a disk substrate 866.

The inorganic deelectric layer 861 has a constant or approximately constant thickness of about 90 nm.

The recording layer 863 is composed of GeSbTe and has a constant or approximately constant thickness of about 20 nm to about 30 nm. In the recording layer 863, the crystal state and the non-crystal state are made by the heat due to exposing of the laser beam, and by using the difference of the reflectances of light in the cases of the crystal state and the non-crystal state, optical recording of a signal is carried out.

The deelectric layers 862 and 864 are composed of ZnS—SiO$_3$ and put the recording layer 863. The deelectric layer 862 has a constant or approximately constant thickness of about 100 nm and the deelectric layer 864 has a constant or approximately constant thickness of about 20 nm to about 30 nm.

The aluminium layer 865 has a constant or approximately constant thickness of about 150 nm.

The disk substrate 866 is composed of, for example, plastics and has a constant or approximately constant thickness of about 1 mm to about 1.2 mm.

In the optical disk apparatus 100, the near field optical recording or the near field optical reproducing is carried out using the near field optical system 100. In this case, the optical disk 80 is arranged near the solid immersion lens 3 and, under the condition that the distance (air gap) between them is held as 40 nm, recording and/or reproducing of signals is carried out In the near field recording use optical disk 80 shown in FIG. 8, the first deelectric layer 861 is arranged in stead of the light transmission protection layer of the optical disk 89 shown in FIG. 7. The deelectric layer 861 has the function of preventing the comparatively soft deelectric layers 862 and 864, which hold the recording layer 863, from scattering by the heat due to laser exposing when optical recording.

The optical disk 80 is formed by an opposite sequence sputtering method, which is different from the method for the optical disk 89 shown in FIG. 7, for stacking on the disk substrate 855 in order of the aluminium layer 865, the deelectric layer 864, the recording layer 863, the deelectric layer 862, and the inorganic deelectric layer 861.

The light exposed to the optical disk 80 and reaching the recording film 863 is obtained by calculating the transmittance of the stacked films.

FIG. 9 is a view of the characteristics showing the amplitude transmittance of the beam which passes through the inorganic deelectric layer 861 and the deelectric layer 862 and reaches the recording layer 863, when the converging beam of the laser beam is emitted to the optical disk 80.

This view of the characteristics shows the amplitude transmittance of p-polarized light (TM wave) and s-polarized light (TE wave) of the light beam which reaches the recording layer 863, where the inorganic deelectric layer 861 is composed of silicon dioxide SiO$_2$ (refractive index n is approximately 1.47).

In the FIG. 9, the horizontal axis corresponds to the exposing angle (n sinθ) of the light beam, for example nsinθ=0 corresponds to the light beam exposing with right angles, and nsinθ=1.5 corresponds to the light beam from the outer circumference area (Marginal Ray) and corresponds to the effective numerical aperture $NA_{eff}$ of the optical system 10 comprising the objective lens 2 and the solid immersion lens 3.

When calculating the amplitude transmittance, the condition is same or approximately same to the condition under actual using. The amplitude transmittance is obtained where the air gap $\underline{A}$ is 40 nm and the thickness of the inorganic deelectric layer 861 is 90 nm.

In the view of the characteristics of FIG. 9, the amplitude transmittance of the light passed through the outer circumference area is approximately 35% in the p-polarized light and approximately 30% in the s-polarized light.

FIG. 10 is a view of the characteristics showing the amplitude transmittance in the case only changing the material of the inorganic deelectric layer 861 to silicon nitride SiN (refractive index $\underline{n}$ is about 2.0) against the optical disk 80 shown in FIG. 9.

In the view of characteristics of FIG. 10, the amplitude transmittance of the light passed through the outer circumference area of the optical system is approximately 59% in the p-polarized light and approximately 64% in the s-polarized light, that is, the transmittance is improved in comparison with the characteristics shown in FIG. 9.

As mentioned above, if using SiN that refractive index $\underline{n}$ is larger than $SiO_2$ as the inorganic deelectric layer 861, the laser beam from the solid immersion lens 3 reaches the recording layer 863 more easily. Further, if using SiN with large refractive index as the inorganic deelectric layer 861, more suitable coupling (or coupling efficiency) can be obtained to the light beam with large exposing angle. Note that, in the case shown in FIG. 10, the refractive index of the inorganic deelectric layer 861 ($\underline{n}$ is approximately 2.0) is equal or greater than the refractive index of the solid immersion lens 3 ($\underline{n}$ is approximately 1.83).

Further, as shown in FIG. 9 and FIG. 10, it is desirable that the amplitude transmittance of the light beam passing through the outer circumference area is equal or greater than 30%, and since an intensity of transmission luminous flux can be obtained by the square of an amplitude transmittance, it is desirable that intensity transmittance is equal or greater than 10%.

By setting the amplitude transmittance like this, it is capable to make the contribution of converged light to forming of light spots improve and realize an optical recording medium capable high density recording.

Figure indicated by putting the difference of coupling between the case of FIG. 9 using $SiO_2$ for the inorganic deelectric layer 861 of the optical disk 80 shown in FIG. 8 and the case of FIG. 10 using SiN for the inorganic deelectric layer 861, to the optical transfer function (MTF: Modulation Transfer Function) in the optical recording and reproducing is shown in FIG. 11.

The vertical axis in FIG. 11 indicate normalized optical signal amplitude, the horizontal axis in FIG. 11 indicate normalized spatial frequency, and the case the spatial frequency is 2 corresponds to the cut off spatial frequency fc.

In the view of the characteristics shown in FIG. 11, if using SiN for the inorganic deelectric layer 861 which is a case shown in FIG. 10, the MTF becomes larger in the area near the cut off spatial frequency. In the case the amplitude transmittance in the high NA area is higher shown in FIG. 10, more reasonable frequency characteristics is indicated and it is suitable for high density recording.

In the FIG. 9 to FIG. 11, it is shown as an example that the configuration of the optical disk 80 is optimized by calculating the stacked film transmittance of each of light beams including from a light beam vertically exposing on the optical axis to a light beam from the outer circumference area, it can be optimized similarly by measuring the transmittance. Further, by using the inorganic deelectric layer comprising multiple layers, not single layer, it can be optimized similarly. It is desirable that the refractive index of the outermost layer on the side the converged light is exposed among inorganic deelectric layers of the single layer or the multiple layers is equal or greater than the refractive index of the optical system 10 and the refractive index of the solid immersion lens 3.

In the embodiment mentioned above, the optical system 10 comprises the objective lens 2 and the solid immersion lens 3, and the optical system 10 that numerical aperture is approximately 1.5 is mounted on the optical pickup 10.

But, an optical system comprising singular optical device formed by uniting the objective lens 2 and the solid immersion lens 3 may be mounted on the optical pickup 10.

As the singular optical device like this, for example, a reflection type light converging device disclosed in Chul Woo Lee, Kun Ho Cho, Chong Sam Chung, Jang Hoon Yoo, Yong Hoon Lee, "Feasibility study on near field optical memory using a catedioptric optical system," Digest of Optical Data Storage, pp.137–139, Aspen, Colo. (1998) may be used.

Further, as an optical device having the function of the objective lens 2 and an optical device having the function of the solid immersion lens 3, three or more optical devices may be mounted on the optical head 1, and a hologram device may be mounted.

Further, according to the air gap, by using a floating slider, not using the double axes electromagnetic actuator, the slight gap such as approximately 40 nm may be realized.

Though a phase change type optical disk 80 is shown as an example of an optical disk 80, it can be applied to the various optical recording medium for carrying out optical recording and reproducing (especially, near field optical recording and reproducing) such as a magneto-optic disk, an optical disk using pigment materials etc.

Though the method for carrying out the near field optical recording or the near field optical reproducing to the optical recording medium which is rotational and has disk shape, is described above, similar method can be applied when recording signals optically to, for example, a card type optical recording medium and a bulk type optical recording medium and/or when reproducing signals optically from, for example, a card type optical recording medium and a bulk type optical recording medium.

When the near field optical recording and reproducing are carried out by using optical devices such as the solid immersion lens, the coupling of the high NA component of the luminous flux to an optical recording medium works as an important part.

By adding an inorganic deelectric layer including single layer or multiple layers on the face the light is exposed of an optical recording medium, the contribution of the high NA component of the luminous flux to the forming of light spots in the optical recording and/or reproducing, especially in the near field optical recording and/or reproducing is improved and higher density and large amount of optical recording medium can be realized.

When using phase change materials as an optical recording medium, the inorganic deelectric layer 861 has the function of preventing the comparatively soft deelectric layers 862 and 864, which hold the recording layer 864, from scattering by the heat due to laser exposing when optical recording.

Further, by using the material having a refractive index equal or greater than the refractive index of an optical device as the inorganic deelectric layer 861, the coupling efficiency of the high HA component of the luminous flux can be made higher.

Especially, by optimizing the layer configuration of an optical recording medium in such a way that the amplitude transmittance to the light beam from the outer circumference area (marginal beam) becomes equal to 30% or more or approximately equal to 30% or more, an optical recording medium suitable for high density recording and/or reproducing may be realized.

Note that, the embodiment mentioned above is an example of the present invention, namely, the present invention is not limited to the embodiment mentioned above.

According to the optical recording medium of the present invention, the optical pickup and the optical recording and/or reproducing apparatus of the present invention, when the converged light from the optical system forms a light spot on the recording layer, the contribution of the converged light to the forming of the light spot can be improved, so that the higher density recording is achieved.

What is claimed is:

1. An optical recording medium to which light for recording and/or reproducing a signal is emitted, comprising
   one or a plurality of inorganic deelectric layers provided at an incident side to which the light is converged, and
   an amplitude transmittance, which is a ratio of the light reached to a recording layer in the optical recording medium to said converged light passed through outer circumference area of an objective lens, being equal or greater than 30%.

2. An optical recording medium as set forth in claim 1, wherein said objective lens comprises a solid immersion lens having a large numerical aperture to form a near field.

3. An optical recording medium as set forth in claim 2, wherein a refractive index of the outermost layer among said inorganic deelectric layers is equal or greater than the refractive index of said objective lens.

4. An optical recording medium, as set forth in claim 2, further comprising a first and a second deelectric layers, and wherein
   said recording layer is positioned between said first and said second deelectric layers, and
   said first deelectric layer is positioned between said inorganic deelectric layer and said recording layer.

5. An optical recording medium as set forth in claim 2, wherein said inorganic deelectric layer is a single layer of silicon nitride (SiN).

6. An optical pickup, comprising:
   a light source;
   an optical system for converging light from said light source and emitting the converged light to an optical recording medium; and
   a photodetector for outputting an output signal in response to light reflected at said optical recording medium and passed through the optical system, and
   said optical recording medium comprising one or a plurality of inorganic deelectric layers provided at an incident side to which said converged light from said optical system is emitted, and a refractive index of the outermost layer among said inorganic deelectric layers is equal or greater than the refractive index of said optical system, and
   an amplitude transmittance, which is a ratio of the light reached to a recording layer in the optical recording medium to said converged light from said optical system passed through outer circumference area of said optical system, being equal or greater than 30%.

7. An optical pickup as set forth in claim 6, wherein said optical system comprises;
   an objective lens for converging the light emitted from said light source, and
   a solid immersion lens having a large numerical aperture to form a near field for converging the light passed through said objective lens and emitting the light to said optical recording medium, and
   the refractive index of the outermost layer among said inorganic deelectric layers is equal or greater than the refractive index of said solid immersion lens.

8. An optical pickup as set forth in claim 6, wherein;
   said light source is a laser for outputting a blue or a blue purple laser beam, and
   said optical system is a near field optical system.

9. An optical recording and/or reproducing apparatus, comprising:
   a light source;
   an optical system for converging the light from said light source and emitting the converged light to an optical recording medium;
   a photodetector for generating an output signal in response to light reflected at said optical recording medium and passed through the optical system;
   a modulation circuit for modulating the intensity of the light from said light source in response to the recording signal to said optical recording medium; and
   a detection circuit for detecting said signal recorded on said optical recording medium in response to the output signal from said photodetector, and
   said optical recording medium comprising one or a plurality of inorganic deelectric layers provided at an incident side to which said converged light from said light system is emitted, and a refractive index of the outermost layer among said inorganic deelectric layers is equal or greater than the refractive index of said optical system,
   an amplitude transmittance, which is a ratio of the light reached to a recording layer in said optical recording medium to said converged light from said optical system passed through the outer circumference area of said optical system, being equal or greater than 30%.

10. An optical recording and/or reproducing apparatus as set forth in claim 9, wherein;
    said optical system comprises
    an objective lens for converging the light emitted from said light source, and
    a solid immersion lens having a large numerical aperture to form a near field for converging the light passed through said objective lens and emitting the light to said optical recording medium, and
    the refractive index of the outermost layer among said inorganic deelectric layers is equal or greater than the refractive index of said solid immersion lens.

11. An optical recording and/or reproducing apparatus which is an optical disk apparatus as set forth in claim 9, wherein;
    said light source is a laser for outputting a blue or a blue purple laser beam,
    said optical system is a near field optical system.

* * * * *